United States Patent Office 3,446,755

Patented May 27, 1969

3,446,755

PERFUME CONTAINING OXO SUBSTITUTED 3a,4,5,6,7,7a-HEXAHYDRO-4,7-METHANOINDENE

Harry C. Saunders, Nutley, N.J., assignor to Universal Oil Products Company, Des Plaines, Ill., a corporation of Delaware No Drawing. Filed Oct. 22, 1965, Ser. No. 502,560
Int. Cl. C11b 9/00; C07c 49/82
U.S. Cl. 252—522 1 Claim

ABSTRACT OF THE DISCLOSURE

A perfume composition containing 3a,4,5,6,7,7a-hexahydro-4,7-methanoindene, substituted in one of the 5 and 6 positions with an oxo group.

This invention relates to perfume compositions and more particularly relates to a synthetic spike lavender oil comprising 3a,4,5,6,7,7a-hexahdydro-4,7-methanoindene substituted in one of the 5 and 6 positions with an oxo group.

Spike lavender oil, also known as Spanish spike oil or aspic, is a natural essential oil derived from the plant, Lavandula latifolia, which grows wild in many of the Mediterranean countries, with the principal commercial crop growing chiefly in Spain. This natural oil, consisting of an admixture of a large number of substances such as camphor, borneol, linalool, and cineol, has a fresh and herbaceous odor with a somewhat dry-woody undertone which renders such oil highly useful for perfumery application. This natural oil, however, like other products derived from plants, and especially wild, uncultivated plants, suffers from the disadvantage of fluctuating supply and quality due to such uncontrollable factors as crop-growing weather. Obviously, therefore, a synthetic replacement for spike lavender oil which is stable in supply and quality would be highly desirable in the perfume industry, which depends upon a constant and stable supply of natural spike lavender oil for a large number of commercial products. Such a synthetic replacement, having the desirable perfumery properties of natural spike lavender oil, has now been discovered and, moreover, this synthetic replacement is derived from non-natural sources which render such replacement both dependable in availability and consistent in quality.

Accordingly, an object of this invention is to provide a synthetic perfumery material utilizable as a replacement for natural spike lavender oil. Another object is to provide a synthetic spike lavender oil comprising an oxo substituted 4,7-methanoindene. A still further object of this invention is to provide perfumes having as the natural spike lavender oil constituent thereof a synthetic replacement comprising an oxo substituted 4,7-methanoindene.

The 3a,4,5,6,7,7a-hexahydro-4,7-methanoindene substituted in one of the 5 and 6 positions with an oxo group, hereinafter referred to for convenience as hexahydromethanoindene, which may be used according to this invention to create a synthetic replacement for natural spike lavender oil has the following structural formula:

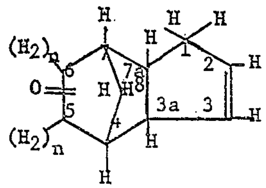

where $n$ is an integer of 0 to 1 provided that for the carbon atom in the 5 or 6 position which is substituted with the oxo group, the integer associated therewith is 0 and the other integer is 1. Because of the existence of the double bond in the hexahydromethanoindene, the positions 5 and 6 are not chemically equivalent, and accordingly when the hexahydromethanoindene is substituted with the oxo group, different isomeric compositions result depending upon whether the oxo group is on the 5 or 6 positioned carbon atom. The extremely close physical similarity of such isomers, moreover, prevents ready identification and separation of the different isomers from each other. For this reason, it is intended that both isomeric compositions as well as any mixtures thereof be described in this specification and appended claims as 3a,4,5,6,7,7a-hexahydro-4,7-methanoindene substituted in one of the 5 and 6 positions with an oxo group.

As hereinbefore indicated the synthetic spike lavender oil composition of this invention comprising the hexahydromethanoindene has the particularly desirable feature of being obtained from readily available, non-natural sources such as cyclopentadiene which thus avoids fluctuations in supply and quality which characterize a naturally obtained substance such as spike lavender oil. The hexahydromethanoindene, that is 3a,4,5,6,7,7a-hexahydro-4,7-methanoindene substituted in one of the 5 and 6 positions with an oxo group, is prepared by reacting cyclopentadiene dimer 3a,4,7,7a-tetrahydro-4,7-methanoindene with aqueous sulfuric acid to obtain 3a,4,5,6,7,7a-hexahydro-4,7-methanoindenol substituted in one of the 5 and 6 positions with the hydroxy group. This methanoindenol is then converted to the desired 3a,4,5,6,7,7a-hexahydro-4,7-methanoindene substituted in one of the 5 and 6 positions with an oxo group either by oxidation such as with potassium dichromate in the presence of sulfuric acid or by dehydrogenation with a suitable catalyst such as copper chromite.

The synthetic spike lavender oil of this invention possessing the desirable odor and perfumery properties of natural spike lavender oil, and in particular its fresh, refreshing notes, may like the natural spike lavender oil be combined with other natural or synthetic materials such as blenders or fixatives to render the material more suitable for perfumery use. For example, the synthetic spike lavender oil of this invention may be combined with blenders such as rosemary, sage, eucalyptus, or bois de rose oil or with fixatives such as cedarwood oil, oakmoss products or patchouli oil to improve its perfumery properties.

The synthetic lavender oil of this invention may be used to replace the natural spike lavender oil constituent of perfumes either in whole or in part and thus create new perfume compositions. As used herein, the term perfume means a mixture of organic compounds including for example alcohols, aldehydes, ketones, esters and frequently also hydrocarbons which are combined in fixed proportions so that the odors of the individual compounds combine to produce a harmonious fragrance. The quantity of the synthetic spike lavender oil composition of this invention comprising the hexahydromethanoindene which may be used in perfumes as a replacement for the natural spike lavender oil constituent thereof may vary within a wide range and depends upon the particular type of perfume being created. Generally, however, the amount of synthetic spike lavender oil in perfumes may range from about 0.1 to 80 percent of the total weight of the perfume with a quantity of about 20 to 50 percent by weight being preferred.

The perfumes of this invention having as a principal constituent the synthetic spike lavender oil composition of this invention may be used per se or incorporated into items such as cosmetic creams, soaps, synthetic detergents, talcum powders or other toilet goods such as shampoos to produce products having desirable commercial fragrance properties and, in particular, fresh, refreshing odors.

The following examples are cited to illustrate the synthetic spike lavender oil composition of this invention and the novel perfume compositions created through use of such synthetic spike lavender oil composition as a replacement for the natural spike lavender oil constituent of perfumes.

Example I

A synthetic spike lavender oil comprising 3a,4,5,6,7,7a-hexahydro-4,7-methanoindene substituted in one of the 5 and 6 positions with an oxo group was sampled on a perfume blotter and the odor was compared with the odor of natural spike lavender oil. It was observed that the synthetic spike lavender oil had a fresh and herbaceous odor with a somewhat dry-woody undertone which closely resembled the odor profile of natural spike lavender oil.

Example II

A Bouquet-type soap perfume was prepared using natural spike lavender oil according to the following formula as reported in Poucher, W. A., Perfumes, Cosmetics and Soaps 2:351 (1959):

| Components: | Parts by weight |
|---|---|
| Spike lavender oil | 100 |
| Terpineol | 200 |
| Rosewood | 200 |
| Diphenyl oxide | 30 |
| Cedarwood | 100 |
| Citronella, Java | 200 |
| Clove | 50 |
| Linalyl acetate | 50 |
| Red thyme | 20 |
| Styrax resin | 20 |
| Musk xylene | 20 |

A second Bouquet soap perfume was prepared using the same formula as above, except that the natural spike lavender oil constituent was replaced with 100 parts by weight of 3a,4,5,6,7,7a-hexahydro-4,7-methanoindene substituted in one of the 5 and 6 positions with an oxo group.

The odor profiles of the above two Bouquet soap perfumes were compared and were found to be substantially similar especially in respect to both having fresh, refreshing notes which characterize perfume compositions containing natural spike lavender oil.

I claim as my invention:

1. A perfume composition containing 3a,4,5,6,7,7a-hexahydro-4,7-methanoindene substituted in one of the 5 and 6 positions with an oxo group and perfume blenders or fixatives.

References Cited

FOREIGN PATENTS 1,037,622 8/1958 Germany.

OTHER REFERENCES

Chemical Abstracts 40: 1459 (1946).

ALBERT T. MEYERS, *Primary Examiner.*

VERA C. CLARKE, *Assistant Examiner.*

U.S. Cl. X.R.

260—586